(12) United States Patent
Pen

(10) Patent No.: US 11,836,720 B2
(45) Date of Patent: Dec. 5, 2023

(54) INFINITELY SCALABLE CRYPTOCURRENCY SYSTEM WITH FAST, SECURE VERIFICATION

(71) Applicant: The Pen, West Hollywood, CA (US)

(72) Inventor: The Pen, West Hollywood, CA (US)

( * ) Notice: Subject to any disclaimer, the term of this patent is extended or adjusted under 35 U.S.C. 154(b) by 425 days.

(21) Appl. No.: 15/917,855

(22) Filed: Mar. 12, 2018

(65) Prior Publication Data
US 2019/0279210 A1   Sep. 12, 2019

(51) Int. Cl.
*G06Q 20/40* (2012.01)
*G06Q 20/38* (2012.01)
(Continued)

(52) U.S. Cl.
CPC ..... *G06Q 20/401* (2013.01); *G06Q 20/38215* (2013.01); *H04L 9/0637* (2013.01);
(Continued)

(58) Field of Classification Search
CPC ........... G06Q 20/401; G06Q 20/38215; G06Q 2220/00; G06Q 20/065; G06Q 20/223;
(Continued)

(56) References Cited

U.S. PATENT DOCUMENTS

| 9,608,829 B2 | 3/2017 | Spanos et al. | |
| 10,541,807 B1 * | 1/2020 | Morimura | H04L 9/3239 |

(Continued)

FOREIGN PATENT DOCUMENTS

| WO | WO-2019081917 A1 * | 5/2019 | ............ G06F 21/64 |
| WO | WO-2019178300 A1 * | 9/2019 | ......... G06F 16/2246 |

OTHER PUBLICATIONS

Nakamoto, Satoshi (pseudonym), Bitcoin: A Peer-to-Peer Electronic Cash System [BITCOIN], Oct. 2008, https://bitcoin.org/bitcoin.pdf, p. 3, Section 4.
(Continued)

*Primary Examiner* — Patrick McAtee
*Assistant Examiner* — Vincent I Idiake

(57) ABSTRACT

A novel architecture for a infinitely scalable cryptocurrency system is disclosed in the form of multilevel tree hierarchy of blockchains, where the hash for each block in each blockchain is not only passed to the next block in that blockchain, but is also passed to at least one other blockchain on another level to be included in its own hashes, such that no change can be made in any of the blockchains in the hierarchy without recomputing them all. To facilitate maintaining these multiple levels of blockchains, a novel proof of connectivity lottery method is disclosed whereby all active devices connected online associated with a particular blockchain exchange messages where a hash that cannot be controlled by any particular device determines the winner of the lottery. To expedite transmission of messages in a peer-to-peer network, a further innovation is disclosed in the form of a nested propagation network, where an ordered register of devices online is divided into successively subdivided segments, which can then be used to complete propagation of a message across the peer-to-peer network in a minimum number of theoretical hops.

3 Claims, 3 Drawing Sheets

(51) Int. Cl.
*H04L 9/32* (2006.01)
*H04L 9/06* (2006.01)
*H04L 67/104* (2022.01)
*H04L 9/08* (2006.01)
*H04L 9/00* (2022.01)

(52) U.S. Cl.
CPC .......... *H04L 9/0643* (2013.01); *H04L 9/0825* (2013.01); *H04L 9/3247* (2013.01); *H04L 9/3297* (2013.01); *H04L 9/50* (2022.05); *H04L 67/104* (2013.01)

(58) Field of Classification Search
CPC ... H04L 9/3297; H04L 9/0825; H04L 9/0643; H04L 9/0637; H04L 9/3247; H04L 2209/38; H04L 67/104; H04L 9/3239
See application file for complete search history.

(56) References Cited

U.S. PATENT DOCUMENTS

| | | |
|---|---|---|
| 2016/0330034 A1 | 11/2016 | Back et al. |
| 2016/0342977 A1 | 11/2016 | Lam |
| 2017/0046689 A1* | 2/2017 | Lohe .................. G06Q 20/065 |
| 2017/0154331 A1 | 6/2017 | Voorhees |
| 2017/0257358 A1 | 9/2017 | Ebrahimi et al. |
| 2017/0323392 A1 | 11/2017 | Kasper et al. |
| 2017/0337534 A1* | 11/2017 | Goeringer ............... H04L 63/12 |
| 2017/0344580 A1 | 11/2017 | King |
| 2017/0366516 A1 | 12/2017 | Patttnaik et al. |
| 2018/0025435 A1 | 1/2018 | Karame et al. |
| 2018/0048469 A1 | 2/2018 | Ateniese et al. |
| 2018/0165476 A1* | 6/2018 | Carey .................... G06F 21/64 |
| 2018/0189333 A1* | 7/2018 | Childress ............. H04L 9/3236 |
| 2019/0050831 A1* | 2/2019 | Kikinis .............. G06F 16/2379 |
| 2019/0066068 A1* | 2/2019 | Mitchell ................ G06Q 20/10 |
| 2019/0123892 A1* | 4/2019 | Basu ..................... H04L 9/3297 |
| 2019/0190697 A1* | 6/2019 | Cunico ................. H04L 63/123 |
| 2019/0190896 A1* | 6/2019 | Singh .................. H04L 63/0435 |
| 2019/0349733 A1* | 11/2019 | Nolan ................. H04L 41/0806 |
| 2020/0012809 A1* | 1/2020 | Winarski ............ G06F 21/6218 |

OTHER PUBLICATIONS

Buterin, Vitalik (original author), A Next-Generation Smart Contract and Decentralized Application Platform [ETHEREUM], Dec. 10, 2014 (original publication), https://github.com/ethereum/wiki/wiki/White-Paper (current version).

Schwartz, David, et al., The Ripple Protocol Consensus Algorithm [RIPPLE], 2014, https://ripple.com/files/ripple_consensus_whitepaper.pdf, p. 4.

Kiayias, Aggellos, et al., Non-Interactive Proofs of Proof-of-Work [CARDANO], Dec. 4, 2017, https://eprint.iacr.org/2017/963.pdf, p. 6, Fig. 1.

neo.org (individual author unattributed), NeoContract White Paper [NEO], 2014-2017, http://docs.neo.org/en-us/sc/white-paper.html, Section 2.3.1.

Block One (individual author unattributed), EOS.IO Technical White Paper [EDS}, Jun. 26, 2107, https://github.com/EOSIO/Documentation/blob/master/TechnicalWhitePaper.md.

Popov, Sergeui, The Tangle [IOTA], Oct. 1, 2017, https://iota.org/IOTA_Whitepaper.pdf, Fig. 3.

Lamahieu, Colin, RalBlocks: A Feeless Distributed Cryptocurrency Network [NANO]. circa 2014, https://nano.org/en/whitepaper, Fig. 3.

Mazieres. David, The Stellar Consensus Protocol: A Federated Model for Internet-level Consensus [STELLAR], https://www.stellar.org/papers/stellar-consensus-protocol.pdf, circa 2014, p. 4, Section 3.

* cited by examiner

INFINITELY SCALABLE CRYPTOCURRENCY SYSTEM WITH FAST, SECURE VERIFICATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyrights whatsoever.

OBJECTIVES OF THE INVENTION

Despite the explosion in recent years of interest in cryptocurrencies like Bitcoin, including now literally thousands of so-called altcoins imitative of and largely cloned from Bitcoin, most of these systems share at least three catastrophic structural design flaws which make their promise of widespread adoption as replacements for traditional fiat currencies, or as electronic transaction processing systems, impossible to fulfill in any practical ultimate sense. This disclosure will identify and analyze these problems, and then proceed to teach novel and robust solutions to them all, including the required enabling algorithms to create a new generation cryptocurrency which we might call "TreeCoin."

BACKGROUND: THE STRUCTURAL PROBLEMS WITH CURRENT CRYPTOCURRENCIES

The first problem is scaling. Currently Bitcoin, the most established cryptocurrency system, and the one on which the specific numeric examples of problems below is based, is only capable of handling about 10 transactions per second. By contrast, VISA can handle 10,000 transactions per second or more. If a cryptocurrency were to ever hope of rising to the level of useful global adoption of something like VISA, throughput and rate of ledger creation roughly 3 orders of magnitude higher would have to be achieved.

This problem is fatally linked to the fact that Bitcoin, as generally do all of what are called altcoins, maintains a log of transactions in a single linear blockchain, with a new block being created every certain number of minutes or so. Unless the size of individual blocks was to increase exponentially from current limits, this technology is already at a dead end. Furthermore, though trade in Bitcoin, for example, appears quite lively, most current owners of Bitcoins are just stubbornly holding them for speculation. Were larger numbers of them to seek to sell their coins, presuming buyers could be found, the transaction execution functionality of the system, already under strain, might collapse even now. Indeed, if large numbers of them were to try to cash out for their putative market cap value, the price would collapse as well.

The second problem, related to the first, is the fact that to rigorously verify the validity of a claim of Bitcoin ownership, the entire blockchain must be traced, searched and compiled literally back to day and block one of the blockchain ledger. This data structure is currently in excess of 100 gigabytes, and already on the verge of being intractable. We will call this the "database size problem."

The third problem, and the biggest catastrophe from the standpoint of the environment, is that the amount of sheer computer work required to maintain the process of validating new successive blocks is also increasing exponentially, already running at the rate of 50 terawatt hours per year for Bitcoin alone, by a protocol known as "proof of work." This staggering waste of electricity, driven by so-called "miners" simultaneously competing with each other to solve the same absurdly difficult mathematical puzzle, is an escalating ecological disaster in progress, which we will call the "useless work problem."

The intended system design purpose of this miner competition was supposed to be the solution for the so-called double spending problem, which is how to ensure that an instance of digital currency is not used twice, and also to insure immutability of the blockchain, relying on the presumption that to back recompute previously posted blocks would be computationally unfeasible. It was theorized that by making the validator of the next block on the blockchain prove that they had done a lot of work to do so, and having many people competing to be that validator, this would prevent any one entity from being able to control the validation of the chain to their wrongful benefit, or to alter it after the fact. But not only is all this work otherwise a massive waste of energy, it has been substantially defeated in principle by the organization of mining pools of miners working together under one entity, defeating the decentralization that was supposed to be the hallmark of cryptocurrencies.

Notably, this pooling does not relieve the useless work problem even if the work is partitioned in some central way so there is no duplication of calculating work, because the computing arms race continues regardless. Even within a single pool, a larger proportion of any reward goes to a node doing more calculations, so the escalation is relentless, as the cryptocurrency protocol itself makes the problem to be solved that much proportionately harder. We note, for later reference below, that the implementation of specially dedicated ASIC (application specific integrated circuit) mining hardware, capable of massively accelerated computing speeds running one particular protocol of cryptocurrency hash only, means that no longer can any general purpose computer effectively compete, and the now warehouse sized ASIC rigs can do nothing else.

Moreover, cryptocurrencies were held out to be potentially free of transfer transaction fees, presuming that miners would be mostly happy to perform the computational work of keeping the system going because of the reward of minting the creation of new coins associated with winning the block by block computing race. But even now miners are demanding increasing transaction fees as a condition of having one's transactions validated promptly because of the already pressing scaling problem, and in the particular case of Bitcoin even the newly minted coin reward goes away in 2140 by design.

There are two additional problems inherent in all previous peer-to-peer networks which we will want to solve so that the other innovations disclosed herein operate efficiently, which we will refer to as the "timestamp uncertainty problem," and the "indefinite message propagation time problem."

Ordinary peer-to-peer networks do not have reliable timestamp certainty. It is not as if existing banking systems don't require timestamp synchronization between a server and a client system to operate. If a merchant client in a VISA system tries to submit a transaction and its timestamp diverges too much from the server master clock it will be rejected for that reason alone. But even in conventional banking systems the permitted offset is often relatively large, in typical systems on the order of 5 minutes. This is unacceptable for our purposes, and must be dramatically improved.

In addition, existing peer-to-peer networks connect with each other in a jumble of random sprawl, so there is no empirical way to predict how may hops it will take to reach all nodes on the network, with an extended indefinite tail of propagation non-completion percentage. At some point of time such systems will presume that message propagation has reached all nodes in the network, but this is far from optimum. Furthermore, nodes have to constantly exchange back and forth queries as to whether they have received a particular new message or not, not knowing where in the message propagation spider web for that message they might be, increasing network traffic.

General Principles Applicable to All Cryptocurrencies

All cryptocurrencies are based on some implementation of a one way digital hashing function. It is a called a one way function because it is relatively easy to compute the output from the input, but as a practical matter it is impossible to compute the input from the output. Nor is it possible to predict the effect on the output of even a small change in the input, such as to control the output result. In practice the process will start with the generation of a pair of digital keys, one private and one public. A particular message is then signed with the private key. Using the public key it can be proven that the message was signed with the private key.

Hashes are also used in blockchain systems to make their sequential block ledgers immutable. A hash is computed of all the data in the previous block, including candidate transactions to be verified and committed to the running sequential ledger, and this hash is incorporated into the next block. But since no change can be made in a previous block without changing that hash in an unpredictable way, this could not be made to match the previous block hash value incorporated into the next block, and the ledger record of all transactions is considered immutable, usually by presuming that enough hashing power to recompute a series of blocks is not controlled by one entity.

ALGORITHMS TO SOLVE THE SCALING PROBLEM

Figure 1:
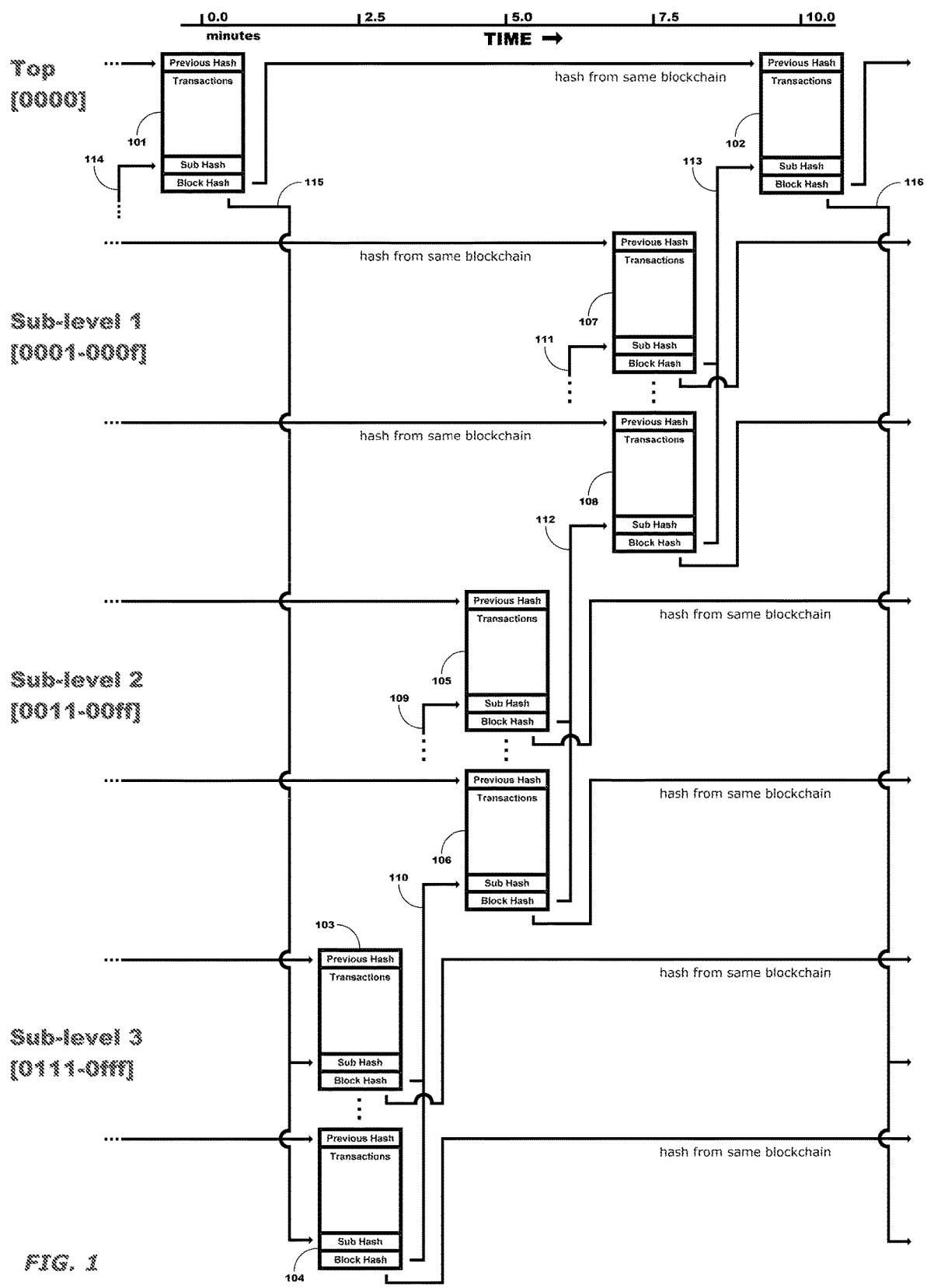
FIG. 1 is a schematic representation of a multilevel tree hierarchy of blockchains architecture according to the system of this invention.

As a solution to the scaling problem this disclosure teaches the creation of a multilevel tree hierarchy of blockchains. Under this novel system architecture we will first determine an optimum block size. Genesis of the first blockchain can initiate and proceed in the conventional manner, which we will call the top blockchain. But at any point that there are more transactions than would be optimum for a current blockchain, which we will call the "first limiting parameter," based either on a target maximum block size or the number of accounts participating on the blockchain, a new sub-blockchain in a set of additional blockchains is initiated by the system, and a sub-ledger of a new series of transactions is kept there. Here, "set" is defined as a non-negative whole number of blockchains, which before the first additional blockchain is initiated has a set size of zero, an empty set.

This solution is clearly distinguishable from various known side chain proposals and private off chain "wallets" as add-ons to existing cryptocurrency systems, with different functional purposes than the blockchain being added onto. In this new system all blockchains are functionally the same within their own local blockchain in the multilevel system. And as we will see, our multilevel tree hierarchy of blockchains system could not have been foreseen without also the invention of the other enabling algorithms solving all the other problems, on which it is dependent for optimum operation.

In one preferred multilevel embodiment, we will also determine an optimum number of sub-blockchains to maintain under a particular local blockchain, which we will call the "second limiting parameter," starting with the top blockchain. When the first sub-blockchain has more transactions to record than can be accommodated by the optimum block size, another sub-blockchain is initiated in the same way. When all of those optimum number of sub-blockchains are at the point where the number of transactions would exceed their optimum size, sub-sub-blockchains can be initiated in a like manner, and so on. In this way the set of additional blockchains can be thought of as being divided into successive sub-levels.

A preferred embodiment would be to make it easy to identify where amidst these branched levels a particular local blockchain is positioned. Since digital data is conveniently represented in hexadecimal format, an optimum number of sub-blockchains to have directly under a blockchain above it in the tree hierarchy might be 15, the second limiting parameter in this case. Any other number could be used. But using the number 15 as our optimum branching parameter, this would provide for that many sub-blockchains one level below the top blockchain (sub-level 1), 225 sub-sub-blockchains two levels below the top blockchain (sub-level 2), and 3375 sub-sub-sub-blockchains three levels below the top blockchain (sub-level 3), for a total of as many as 3616 total blockchains using 3 sub-levels for this embodiment.

We will define the characterization "exponentially branching" to describe this architecture of filling up sub-levels of a set of additional blockchains, with each blockchain in one sub-level having directly under itself a number of blockchains up to the second limiting parameter. It is convenient, but not strictly necessary, for the second limiting parameter to be the same for all sub-levels. In the same exponentially branching manner additional sub-levels can be added approaching the functional equivalent of infinity for all practical purposes.

Strictly speaking, each blockchain in a sub-level can be considered to be capable of having its own further sub-level under itself, and it is not strictly necessary to fill up all further sub-levels below the blockchains at one sub-level before one of the blockchains at one of the further sub-levels branches its own yet further sub-level. But in the most preferred embodiment all blockchains at one sub-level will fully branch before a "lower" sub-level in the set of all additional blockchains starts to populate.

In one preferred embodiment, the system can maintain a sequence number of the last blockchain created (as distinguished from the sequence number of a block in a particular blockchain), and initiate a new one when required by a surplus of transactions to be logged, or by the adding of new accounts, based on an optimum number of participant devices on each blockchain. Note that in this case as the sequence numbers of the blockchains go up as we go to "lower" sub-levels.

Figure 2:
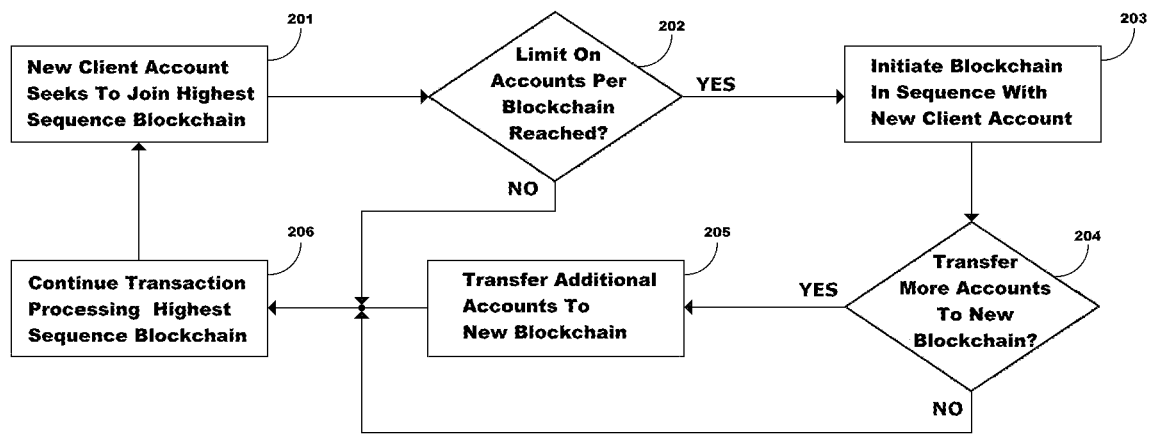
FIG. 2 is a flow chart illustrating the process for initiating a new blockchain.

We can implement this by the process flow illustrated in FIG. 2, using a parameter, blckAcctsLimit, which is the limit on the number of client accounts to be handled by a particular blockchain, related to the average number of transactions in block, which would relate to an average optimum block size. This is calculated by the following algorithm 1, where szTxn is the size of a single transaction record, szTxnLdgr is the size of the transaction ledger section of a blockchain block, and actTxnRatio, which we will derive empirically by algorithm 4, further below, is the average chance with respect to a particular block, derived from the experience of the network watching itself, of an average account needing to do a transaction that will change its balance or effect some other transaction of the blockchain associated with the client account.

$$\text{blckAcctsLimit}=(\text{szTxnLdgr}/\text{szTxn})/\text{actTxnRatio} \quad \text{algorithm 1:}$$

It would be preferable to initiate a new blockchain in sequence with more than just the first new account that would exceed the account limit per block, otherwise for some period of time, even though perhaps brief, that account would have the unilateral prerogative of validating itself. For this purpose we can provide that having reached some limit number a blockchain will split off a certain number of accounts for the new blockchain to start with, 201, 202, 203. Doing this while the devices for moved accounts are online can provide that they can update their own blockchain associations. And as long as the public key associated with a particular client account is unique throughout the system, that account can always be found.

So as an alternative embodiment to algorithm 1, which makes its decisions on a target optimum block size, we could instead set a target of the total absolute number of accounts on a blockchain, easily derived by the number of unique account public keys represented on it. Again, when a defined limit is reached, the accounts on that blockchain can agree to transfer a portion of those accounts to, and to spawn, a new blockchain, 204, 205. At that point the new blockchain proceeds to process its own transactions, 206, and any new account requests in the network are sent to it, as the highest sequence numbered blockchain.

Generally it would be preferable for only the last sequence number blockchain to have the power to spawn a new blockchain in sequence. And any new clients which wish to establish an account on a blockchain would be directed to the last sequence number blockchain for this purpose. But there could also be a provision for reproportioning the blockchains, transferring accounts from one to another to optimize block size according to the history and experience of usage.

From the discussion above, it can be seen that by the time we have created three blockchain sub-levels we have already solved the more than the 3 orders of magnitude scaling problem to bring our new system up to current VISA transaction handling rate levels. And the capacity of the system can be further scaled up from there if necessary extending to additional sub-levels without any inherent structural limit.

We will disclose in a due course below the novel new algorithms required to maintain and validate each of these blockchains. But first, we will teach how all the local blockchains are associated with each other from the standpoint of their associated sequential chains of block hashes.

It is convenient and preferred for our purpose to stagger the validation of the blockchains, which is handled most efficiently if, again, each sub-level is fully populated before a lower sub-level is initiated.

Let us say, for the example of one preferred embodiment, that each blockchain creates a new block every 10 minutes, which is the current target in the Bitcoin system. And let us also presume a top blockchain and 3 levels of sub-blockchains beneath it. In each case, the individual blockchains pass their last hash forward to the next block in their own blockchain for inclusion in it, in the previously known manner.

An algorithm for a process flow using these parameters is illustrated in FIG. 1, where the numbers in the brackets represent the possible range of the hexadecimal sequence numbers, slightly discontinuous below sub-level 1, of the individual blockchains in a particular sub-level. It is convenient to interpret the least significant digit of a sequence number here as the horizontal position of a blockchain in a sub-level, with the remainder, after being right shifted one digit, being the sequence number of the blockchain it is directly under.

In such an exemplary scenario, we will provide that the lowest level of blockchains do their next block validation at the 2½ minute mark on a shared timeline. Here 103 and 104 represent the first and last blockchain in one of the lowest level sets of 15. The hashes of each of these blocks are shared with the blockchain one level above, 110, up to 15 hashes in the example we have been discussing, and 109 for another one of lowest level sets of 15. "Sub Hash" in a block in FIG. 1, is a list array of the hashes being passed in this way to that block.

At the 5 minute mark, each blockchain at the next blockchain level up do their next block in the chain hashes, including in these hashes the up to 15 hashes from the most recent round of hashes received from the blockchains one level below each of them. Here 105 and 106 represent the first and last blockchains in a set of 15 at this next level above, and 111 are each of these blockchains passing up their hashes up to the blockchains at the next level above themselves, and 112 is the same action for another one of the sets of 15 at the same level as 105 and 106.

At the 7½ minute mark each of the blockchains that are positioned one level below the top blockchain likewise do their next block in the blockchain hashes, including in this hash the up to 15 hashes from the blockchains below each of them, transmitting their own hashes to the top blockchain. Here 107 and 108 represent the first and last blockchains in the set of 15 one level below the top blockchain, and 113 is the action of each of these blockchains passing their latest hash up to the next block of the top blockchain, and 114 is the same action from the previous round.

Finally, at the 10 minute mark, the top blockchain does its own next block in the blockchain hash, including the hash of the previous block, 101, in its own blockchain in the new block, 102, and including in just the same way as above the up to 15 hashes from the level of blockchains below it, as just mentioned. The top blockchain also sends its own signature hash, from block 102, to each of the blockchains on the lowest level to be included in their next hash, via 116, creating a recurrent circularity. And then the cycle of our sample preferred embodiment repeats. 115 represents this same hash pass down from the previous round.

Structured in this way, this system also strengthens the surety of the validation of the blocks via this inter-blockchain communication. So for example, the clients in the next local blockchain in the circular sequence can send a message to clients in the previous blockchain to inquire about what the consensus is about their latest validated block, and to return back the hash of that block. Once memorialized in the next block in the next blockchain at another level, this can then be relied on by the previous blockchain as immutable.

Using a construction such as taught above, no after the fact change can be made at any sub-level without affecting the ultimate hash of the last block of the blockchain one level above, or to the top blockchain once it passes its last block signature down to the lowest level. By recurrently propagating these signature hashes through all the blockchains, no blockchain could be changed without changing them all. This immutability can be further enhanced by having each client device include a hash from a previous block, or other number, like the public key of a previous block validator, in the hash it signs for a transaction. Thus, the database integrity of the top blockchain and all of the sub-levels of blockchains is protected.

Algorithms to Solve the Database Size Problem

To solve the database size problem, the first thing we can do, with regards to a particular blockchain in the system, is to consolidate coin account balances. Because it is so easy to generate new private/public key pairs to create a new recipient address for a cryptocurrency transaction, in the wild there is a high degree of fractionalization of cryptocoin fragments controlled by particular individuals. But each of the ledger entries for these fractional pieces consumes database space.

Some might believe that this increases personal security, by requiring that many more keys to steal all the cryptoassets of a particular individual. As a practical matter this feeling of security is illusory. If a hacker compromises your wallet they will have access to all your keys, and you will be wiped out no matter how fractionalized your cryptocoin assets are. There have been continued recurrent instances of gargantuan thefts where hackers penetrated exchanges and literally cleaned them out essentially en masse.

In a further preferred embodiment we will not only consolidate balances, but we will associate a particular individual's balance with a particular blockchain in the tree hierarchy of blockchains, as already suggested above. This makes it convenient to associate the interface device of an individual with the blockchain where their account ledger balance is maintained. And we can then assign each device on the chain a two part account address, acntAddr, the first part of which being the sequence number of the local blockchain, numBlckChain, and the second part of which being a public key, acntPubKey, that is part of a private/public key pair. These keys can be enduring, in case at some future point in time an account might be transferred to another blockchain. The algorithm 2 for forming the account address can be a character string concatenation (the period character representing joining the strings) according to the following:

$$\text{acntAddr}=\text{numBlckChain}.\text{":"}.\text{acntPubKey} \qquad \text{algorithm 2:}$$

This leads naturally to a discussion of client interface devices which are peer-to-peer with each other. In this regard what matters are only the novel algorithms taught by this disclosure. Not only is the particular computing device running these algorithms of no consequence, whether it is a desktop computer, a smart phone, or other communication device, of necessity this new system must be amendable to all such devices, to maximize convenience of adoption. Once the computing device of an individual is so associated with the blockchain where their account balance is maintained, they can easily monitor it directly, providing meaningful security.

Figure 3:
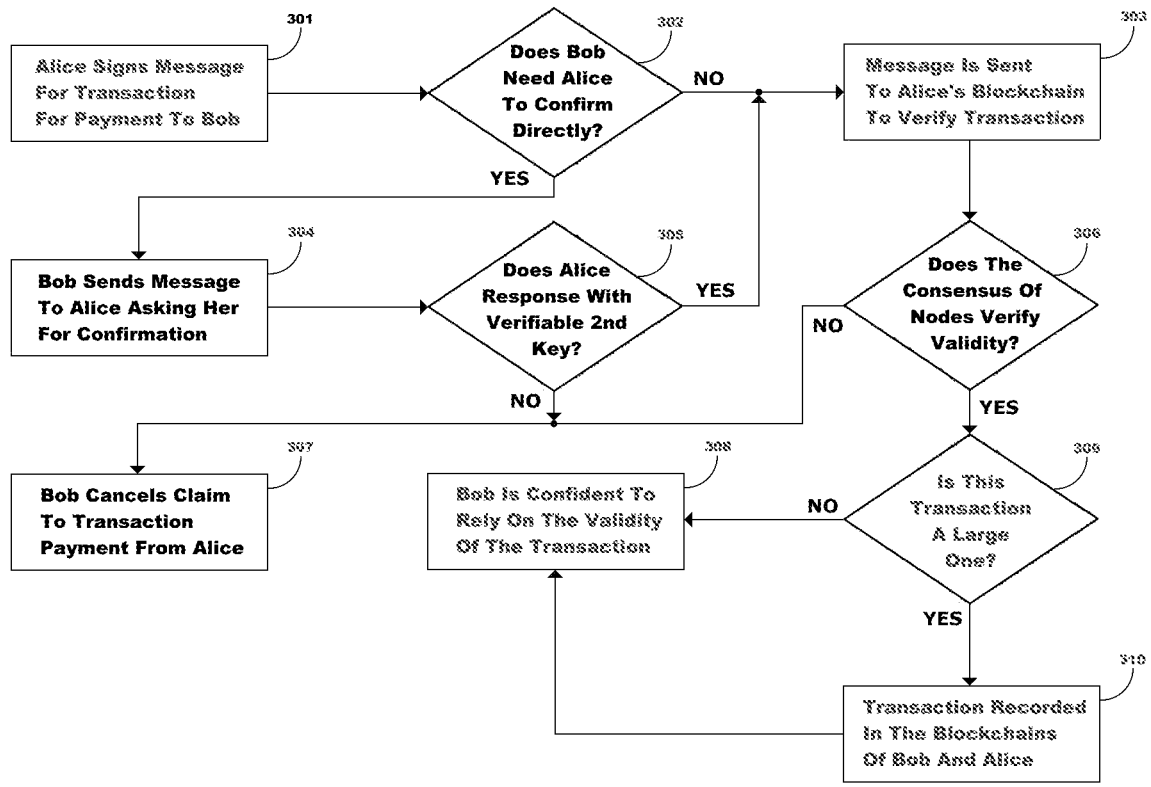
FIG. 3 is a flow chart illustrating the process for submitting and verifying a transaction.

In particular, in another preferred embodiment, for which the algorithm is illustrated in FIG. 3, when Alice wants to transfer some amount of her cryptocoin balance to Bob, she signs a payment transaction message for a payment to Bob, 301. Either Bob or Alice can transmit the message to the blockchain that Alice's account is associated with, 303. For additional security Bob may first be required to communicate back to Alice on her device asking her to confirm the transfer, 302, 304, whereupon Alice provides a second key allowing Bob to further verify the transfer, 305.

If the payment transaction is valid, Alice's account balance is then recomputed on her own associated blockchain, to be written as a data entry in the next block created on that blockchain, and it can be credited to Bob there if he is associated with the same blockchain, or a payment message can be exchanged with his own local blockchain, to be credited to his account address, acntAddr, in the next block in the cycle of that blockchain, 310. As further detailed below, Bob can get fast validation by getting a consensus of the nodes in Alice's blockchain, 306. Otherwise, Bob can cancel his claim to the transaction, 307.

In another preferred embodiment the signature of a transaction can incorporate into its hash to be signed the hash of, or other number from, a previous block in the blockchain, most optimally the last block in the blockchain. This would make it impossible for an attacker to tamper with any block in the blockchain in the future, for to do so would require faking the signature of every transaction in that block, where the attacker only knows the private key for generating his own. This is represented by the following algorithm 3, where sigTxn is the signature of the transaction, txnData is the transaction data, prevBlckData is the number derived from the previous block, sign( ) is a function to sign a number with an account's private key, and H( ) is a hash function to combine multiple inputs into one output of set length, which in one preferred embodiment might be 256 bits.

$$\text{sigTxn}=\text{sign}(H(\text{prevBlckData},\text{txnData})) \qquad \text{algorithm 3:}$$

In the case of a two step verify, if Alice's device is offline in the meantime, or if some attacker tries to claim Alice's balance, without both authorizations from Alice, both the first payment message signature and the confirmation key, no transfer can occur. Having Alice control access to her account balance directly is much more safe than transferring control of any of her keys to some cryptocurrency "exchange." There is no practical reason why a legitimate exchange cannot operate by executing transactions within this cryptocurrency system itself, presuming Alice is exchanging for other currencies, basing the value of the transaction on the value at the moment that Alice confirms back to the exchange, transferring cryptocurrency directly to Alice, or receiving deposits into its own running account, as necessary.

Second, in another preferred embodiment, we can periodically roll the record of Alice's account balance forward in the ledger. This naturally would happen anytime there is a transfer out from, or in to, Alice's running account, writing a new ledger entry in the blockchain with the adjusted balance, superceding the previous ledger entry. But we can also decide on an optimum time refresh period, rfshPeriod, which might be one month in one preferred embodiment, such that even if there are no transactions during that period a new refreshed ledger entry is written for Alice in the latest block in her blockchain.

Once the refresh period is specified, we can derive the acntTxnRatio above, by the following algorithm 4, where numAcntsBlock, is the total number of accounts associated with the local blockchain, numAcntChanges is the sum, over each such account, of the total number of blocks within the refresh period where the account balance was changed, with a minimum of one per account, to account for mandatory account balance roll forward, and blckInterval is the time between each new block validation in the local blockchain (10 minutes in our example above).

acntTxnRatio=(numAcntChanges/numAcntsBlock)/(rfshPeriod/blckInterval); algorithm 4:

Combining both these methods, consolidating balances and periodically rolling them forward, means that it is no longer necessary for anyone on a local blockchain to maintain the entire history of all the blocks in the history of the blockchain where their device resides, let alone what is happening in any other local blockchain. It would still be a simple matter to confirm that none of the hashes of any of the blocks within the blockchain hierarchy have changed, which would be a natural function of doing any of the hashes in the first place. And it is still impossible to tamper with any of the blockchain blocks even within the refresh period without it standing out as invalid, and the only thing that needs to be checked from then on is that part of the database within the refresh period. Though anyone could still archive the entire blockchain history.

None of this prevents an individual from having more than one interface device, though in a system fully optimized system for efficiency this would require an equally individual internet data connection, which could be on a portable device presuming they could be made sufficiently secure.

For the ultimate in security the bulk of one's cryptowealth could be associated with a device that is never connected online except to initiate an account. An individual could then generate a signed transaction from that device, and put it into the network from another device that is online, a payment self-transfer. This can also be done by having the offline device write a signed message to a transfer media, which can then be read by a device that is online, or the offline device can be constructed so that it can write to the online device but not be read by it.

Algorithms to Solve the Useless Work Problem

In the largest sense the choice of a party to validate the next block in a particular blockchain is arbitrary. Either the hash signatures of the transactions in the block are valid or else they are not. If someone does it wrong this can quickly be rejected by the other nodes on the blockchain. No balance can be changed without a signature by the private key controlled by the account holder. The only fears are that some unfaithful validator might discriminate against the transactions of some other individual by not including them in the ledger, or negate a previous transaction that someone else has relied and acted on, with a double spend on its own behalf. But with the current concentration of mining power into pools, these fears are as real as ever.

As originally conceived the "proof of work" protocol was intended to tend to randomize who could earn the right to validate the next block and earn the associated block reward. As it stands now it has become a race as to who can burn up the most electricity doing work of essentially no intrinsic value, only a tiny fraction of which is going into actual block validation, the rest being consumed in make work, worthless except to try to make the blockchain functionally immutable, a problem we solve by the alternate novel means of interchain hash sharing taught above, with reference again to FIG. 1, and by the protocol of signing transactions also incorporating data from a previous block, prevBlckData, where transData is the array of parameters of the transaction, as represented by the following algorithm 5, and as further discussed below.

sigTransaction=sign($H$(prevBlckData,transData)) algorithm 5:

Moreover, because there may still be competing claims in a standard miner driven system as to who has found the next validated block, it is presumed to take 6 cycles, by the standard Bitcoin presumption, before one can even have confidence that you are dealing with the actual longest, and therefore confirmed valid, blockchain, a residual ambiguity only alleviated by the passage of time required for that, about one hour in the Bitcoin example.

Some work has been done on an alternative system of selecting the validating entity of the next block in a blockchain, which is known by the description "proof of stake." Such a system may solve the useless work problem, but requires a central administrating authority to police bad actors, at the penalty of losing deposits they must tender in applying to be a block validator, precisely contrary to the concept of a self-validating decentralized cryptocurrency network, though the provision of a block validation reward is maintained under proof of stake.

As a novel innovation, and a preferred embodiment by the method of this invention, we will conduct what we will call a "proof of connectivity lottery." By this method, during an agreed on time period, a "predetermined time window," each active client device on the local blockchain broadcasts a message to the blockchain, including its public key on the blockchain, acntPubKey, a hash of, or other number from, the previous block in the local blockchain, prevBlckData, a second hash of that data together with their public key, plus a signature of that second hash, sigLottryMsg. This can be represented by the following algorithm 6.

sigLottryMsg=sign($H$(prevBlckData,acntPubKey)) algorithm 6:

In one preferred embodiment this agreed on time period starts just after a new block is validated, at which time its hash is first known, if that is the prevBlckData to be used, and ends at a receive cutoff time, shortly before the next block in the local blockchain is due to be validated.

As a further preferred embodiment by the method of this invention, the lottery will be what we will call "autonomous," defined as being able to be conducted collectively by whatever devices are active on the local blockchain, without an outside or central coordinator or administrator.

The receive cutoff time, after which no more proof of connectivity messages can be sent for that cycle, need only be a short period of elapsed time before the time for the next block to be validated, only long enough to sufficiently allow time for all such messages to propagate throughout the local blockchain network, after which any subsequent such messages are considered non-operative. We will further discuss below the algorithms required to make this possible, for optimizing propagation time and curing timestamp uncertainly.

Once all the proof of connectivity messages in a lottery cycle are sent and received, we can by what we will define as a "competitive criteria," which in one preferred embodiment can be whichever of the lottery message signatures, or some other hash of the account public key with some specified data from the previous block in the blockchain, is the smallest number. And from that each client can itself determine the winning validator of the next block on the local blockchain.

The signature of the proof of connectivity message further proves the identity of the device. And we further note that any device trying to back alter any block would have to demonstrate it was a plausible candidate to have generated such a lottery message signature, or other unpredictable hash, that would have won such a proof of connectivity lottery, by the competitive criteria we have established. That is, its private key would have to be able to generate an extremely low number, if that was the comparative competitive method, when hashed by a function including a hash, or some other specified variable data, from the previous block.

Because any change in the hash of the previous block will have an unpredictable effect on the value of a hash of that hash together with a particular device public key, this acts as a random lottery, and it can immediately be verified by any device on the blockchain as to which device is the proper winner, after sorting the proof of connectivity lottery messages into an ordered register by their lottery message signatures, or whatever other public key associated hash might be used.

Participation in the proof of connectivity lottery also tends to ensure that the winner of the lottery is online and available to do the validation of the next block. If, however, that device fails to do so, after a short latency period the runner up in the lottery online can attempt to do so. In any case, whatever block is received by a client device, as validated by the client device with the best number in the proof of connectivity lottery, by the exemplary comparative protocol we have been discussing, is considered the operating next block with no ambiguity.

As an embodiment of this, the block can be signed by the validating device, or its public key can be included in the data hashed, to create an additional back reference that can be checked by the next block. In addition we can provide that each transaction in the new block be hashed with the signature of the previous block, or some other specified number in that block, and then signed again by the device authorizing the transaction, again by algorithm 5. This combination of features will alone make even the top blockchain as immutable as any proof of work blockchain protocol. But we have already discussed how immutability up the blockchain hierarchy is enforced by incorporating the hashes of the blockchains one level below into the hashchain of the blockchain above, and having the top blockchain circle its hash back down to the lowest level.

It can be provided that would be participants in the lottery must have a preexisting device address on the local blockchain, and cannot just jump on ad hoc for the purpose of the instant lottery. If some new client is directed to join a particular local blockchain, in one embodiment they can participate in the next proof of connectivity during the next predetermined time window.

The net result of implementing this novel improved method is that the network of the active devices on it can run itself on each of the local blockchains, for a small cost of computing power individually, and with no system transaction fees ever required. Without this proof of connectivity lottery, creating a multilevel tree hierarchy of blockchains, the solution taught herein for the scaling problem, would not be feasible, and the fact that no such proof solution was previously known is a complete explanation of why such an extended such tree hierarchy could not have been previously anticipated either.

Algorithms for Sale of Networked Computer Resources

Having achieved the objective of eliminating all the useless work in previous blockchain systems, we are have nevertheless created by the method of this invention a massive potential collective peer-to-peer network of computing power, even without mining pools. This is general application computer power as distinguished from the specialized computer power in a ASIC mining system which can only be used to do otherwise useless mining work. Accordingly, this general purpose computing power can be harnessed to do useful work instead.

In one preferred embodiment each device can opt in to make available its computing power for an external application, and further opt to limit the percentage of its available computing power to be so provided. This collective computing power than can then be sold, and participant devices can be periodically rewarded with new cryptocurrency created in their accounts, and that collective computing power can be sold for either the same cryptocurrency or exchanged for other currencies. This also acts as an additional incentive for individuals to leave their devices active, to be available for participating in the next block validation lottery, and to help administrate the operational overhead of the system. Selling this collective computing power for the cryptocurrency itself would tend to give our cryptocurrency an intrinsic value.

In existing cryptocurrency mining pools participants are rewarded according to the proportion of the collective work that they are doing, as logged by progress markers of near misses. In a like manner participants in a general purpose useful work collective network can be given a reward, devReward, a credit in our same cryptocurrency to be periodically added to the balance of a device's account, according to the following algorithm 7, where devWork is the amount of computing work done by the device, totWork is the total work required by the computing job, and totReward is the compensation to the network in our cryptocurrency for completing the computing job.

$$\text{devReward} = \text{totReward} \times (\text{devWork}/\text{totWork}) \qquad \text{algorithm 7:}$$

In addition, if clients are willing to provide computer storage space, cloud storage space could be resold in the same way. In one preferred embodiment a file to be stored can be divided into segments with enough redundancy so that the original data can be recreated intact from a sufficient number of pieces, providing for devices that might drop offline or fail.

Algorithms to Solve the Timestamp Uncertainty Problem

There is simply no replacement for coordination with a trusted global timestamp source based on UTC time, and such external sources are certainly available online. In one preferred embodiment, we will provide that each client on the network must synchronize with an agreed global UTC time source when it first connects to the network. We will further provide that it must resynchronize on a regular periodic basis from that time point on, which might be a space of 24 hours.

Having made these provisions we will require that each and every message in the system additionally include a timestamp by its creator. A solution for the indefinite message propagation time problem will be presented next. But presuming we can rely on a certain propagation time window, if a message is received by another peer with a timestamp outside that window in relation to the synchronized clock, it will be disregarded, except to message back to the sender that its internal program clock has diverged from the trusted mean. This need not apply to retrieval of past validated blocks in the blockchain.

We will want the maximum offset of each client clock from global UTC time to be substantially less than the length of the propagation time window. If the frequency of this synchronization activity ever exceeds the access graces of available online trusted UTC sources, we can establish our own UTC servers for this purpose.

Algorithms to Solve the Indefinite Message Propagation Time Problem

In order to make deterministic the already referenced proof of connectivity lottery, and to streamline other transaction execution, we wish to ensure full propagation of all messages within a certain relatively short window of time. To do this we will establish the novel protocol for what we will call a "nested propagation" method.

In one preferred embodiment of this we will presume that we have an active "ordered register" maintained by each client in a local blockchain of all other connected client nodes. This would be inherent in the messages that each client sends to confirm it is still online, as a candidate to participate in the proof of connectivity lottery taught above. To these messages we can also add DNS information about the internet address where the client can be connected to, or it can be looked up from a dedicated server if the client devices also communicate with that server.

For full participation to send and receive all messages in the local blockchain a client device must have participated in the previous proof of connectivity lottery, but it could still send a message, for example to authorize or verify a transaction, by sending a message to the local blockchain, asking to connect to devices already on the active ordered register, as we will further discuss shortly below.

Figure 4:
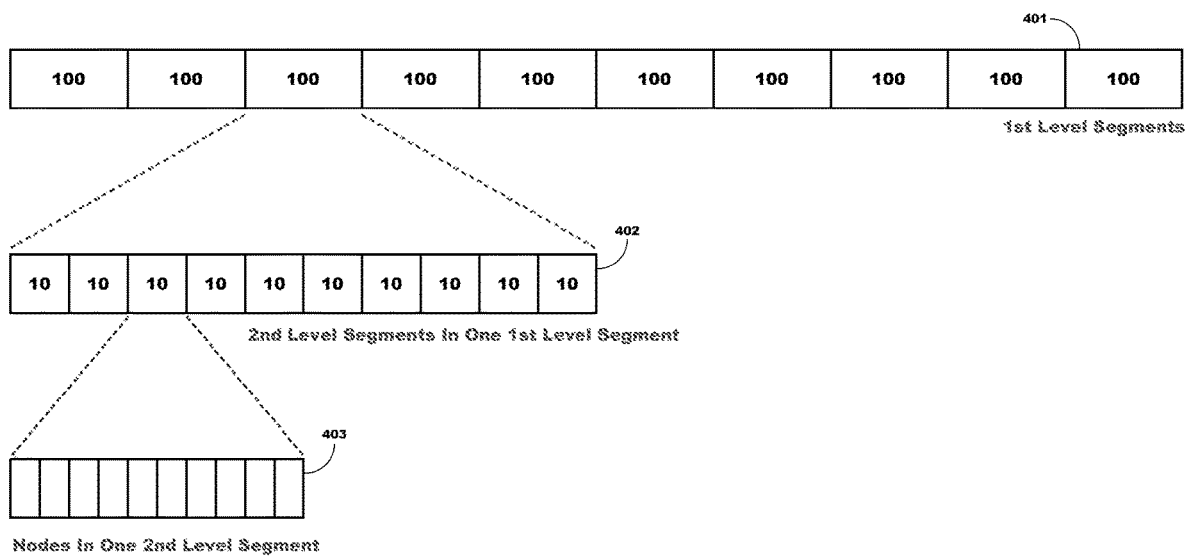
FIG. 4 is a breakout diagram of the segmenting in a representative nested propagation peer-to-peer network with a dividing number of 10 to accommodate 1,000 nodes.

Presuming further that we can count on a maximum anticipated message propagation time, maxPropTime, this active register will not only be ordered according to some competitive criteria, it will be of definite length and membership composition. That is, each node in the local blockchain will have the same working ordered register of currently active nodes to work from. In one embodiment this is achieved by requiring that proof of connectivity messages arrive within the message propagation time window, measured from an agreed lottery message sending cutoff time, sndLottryCutoff, for participating in the current lottery. The receive cutoff time, rcvLottryCutoff, can then be defined by the following algorithm 8.

rcvLottryCutoff=sndLottryCuttoff+maxPropTime    algorithm 8:

Let us presume for a typical example that there are 1,000 client nodes in our ordered register. In one embodiment, we will divide the register into segments using a defined dividing number, which for the convenience of this example we will take to be 10. We now have 10 segments of 100 nodes, which we will call the 1st level segments, 401. We will further divide each of these 1st level segments of 100 nodes by 10 again, each into ten 2nd level segments, 402, of 10 nodes each, and divided again into individual nodes, 403, depicted for example in FIG. 4.

Now we will select at random from each of the ten 1st level segments one primary client to send our message to, and connect to and send that message, including a parameter representing the hop count, starting most naturally with the number 1, to each of those primary clients, to which we will for the moment stay connected. As an additional enhancement there can be situations where it can be estimated which of those primary clients in each 1st level segment is the nearest in terms of the transmission delay of the hop to them, instead of selecting them randomly.

On receiving our message each of those 10 primary clients will be obligated to repeat the process one segment level down. Since each primary client has the same ordered register which it will divide up in the same way, and since each of these primary clients already knows what first segment it lies in, it then connects to and forwards our message, incrementing the hop number, to one random secondary client in each of the $2^{nd}$ level segments, including its own, of that same 1st level segment, and remains connected. If it can't reach any of those clients it selects another.

On receiving our forwarded message, each secondary client, already knowing what 2nd level segment it resides in, completes the transmission process, by forwarding our message to each of the other clients nodes in that 2nd level segment, again incrementing the hop number. Each of these ultimate clients is obligated to confirm back to the secondary client that it has received the message. So the result options might be "could not reach," "invalid" or "confirm."

To confirm that the propagation has been perfected throughout the network, each secondary client sends a message back to each primary client to confirm that it has delivered the messages to each of the clients in its own 2nd level segment. This confirmation can be signed by the each node below, and that signature can be passed through to the node above, to prove that the node has transmitted the message to the nodes below. Nodes that are not properly passing back confirmations can be flagged and discredited in the network.

If a primary client does not receive this confirmation message, or cannot connect to that secondary client at all, it selects another secondary client in the respective 2nd level segment, and sends the same message to that client, until it gets back a completion confirmation. If that other secondary client has already received the message, it will know from the hop number count it is obligated to act as a secondary client itself.

Likewise, the originating sender of the message will be looking for each primary client to confirm back that it has confirmation from all of its own secondary clients, otherwise it selects a different primary client from that 1st level segment at random, and sends the message again. Even if that particular client has received the message itself from another primary or secondary client, it will know from the hop number count that it is obligated to act as a client itself respective to the hop count in the same manner as above.

Figure 5:
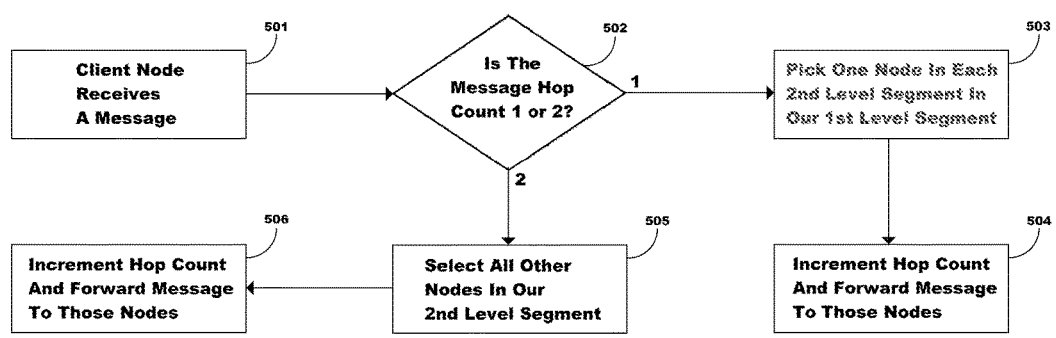
FIG. 5 is a flow chart illustrating the handling of messages by client nodes according to the hop count of the message in a representative 3 hop system.

The process flow of this embodiment is further illustrated by FIG. 5. When a client node receives a message, 501, it checks the hop count in the message, 502. If the hop count is 1 it acts as a primary client, 503, and forwards the message to random secondary clients in each 2nd level segment of its own 1st level segment, incrementing the hop count in the message, 504. If the hop count is 2, it forwards the message to the other nodes in its own 2nd level segment, again incrementing the hop count. 505, 506. The nodes receiving this message with a hop count of 3 do not forward the message further in this embodiment.

By the protocol just taught we have achieved in 3 hops full propagation of our message throughout the local blockchain network. Current cryptocurrency clients can easily handle 32 open internet sockets, which if that was our dividing number would allow reaching roughly 30,000 nodes with confirmations, again in just 3 hops.

In practice from this can be calculated a reasonable maximum anticipated message propagation time window, as referred to above. If the average propagation time per hop was 500 milliseconds, including confirmation messages back we can therefore achieve full propagation throughout the local blockchain ideally in 3 seconds, and in practice not much more than that.

Another thing to recognize is that since every client on the local blockchain is working off the same ordered register, for increased synergy proof of connectivity messages and other messages can be bundled. If two such messages are received by a particular client peer, they can be sent in the same communication to the next client level, if they have the same incremented hop counts. In particular, at the start of the proof of connectivity lottery, the first messages send in the next round will tend thereby to form channels followed by other like messages. In another embodiment we can provide that to actually win the lottery a client must demonstrate it has remained continuously online for some set stable period, at least for the previous lottery.

To confirm that all clients are working off the same ordered register, a hash of this ordered register can be published in the new block by the block validator. From this all nodes can affirm they are working off the same ordered register for that cycle, otherwise they can inquire from other nodes to fetch it.

Additional hops might be provided for if required to extend to additional levels, at a small cost in additional propagation time. For such an example, 4 hops with a dividing number of 10 would reach 10,000 nodes in the same manner as above.

Here we have been talking just about the clients on our own local blockchain. To send a message to a client on another blockchain in the tree hierarchy, in one embodiment we can maintain a server logging clients in that other blockchain, and by exchanging a message with them, or the server itself, their own local ordered register of active nodes can be obtained, and operated on in the same manner as for a client's own local ordered register. It would not necessarily be required to obtain the entire ordered register from another blockchain, just enough 1st level segment primary clients to enter communication into that local message nested propagation network.

Algorithms for Real Time Fast, Secure Transaction Verification

In one preferred embodiment each active device keeps a log of transactions pending to be incorporated into the next block. When Alice wants to authorize a transaction with Bob, she signs a transaction for it, again referring to FIG. 3, 301. This can be sent directly by Alice to her own local blockchain, or sent to Bob for him to do this. If Bob does this, and Bob's client device is on a different blockchain, Bob then fetches a selection of primary clients for Alice's local blockchain and transmits the transaction to them, 303. The message representing this transaction quickly traverses the local blockchain by our nested propagation method.

Whoever sends the message, each client node on Alice's blockchain attempts to verify the transaction, that Alice has enough account balance to cover the transaction in the case of a payment, including all previous transactions of Alice that the node has heard of, that the signature is valid, and passes a verification message back up the nested propagation network If Bob sent the message, he can thereby get a consensus of the active devices on the local blockchain as to whether Alice is good for the transaction, 306, and by the nested propagation network this can happen as quickly as VISA currently authorizes transactions now.

This is already strong assurance. But if Bob wants a greater level of security for large transactions, 309, he can wait until the transaction is actually written into Alice's local blockchain, 310, which in our sample embodiment would take at most 10 minutes, changing Alice's account balance and recording the transfer to Bob. Once this has happened, it is communicated to the blockchain the Bob's account is associated with so that his own balance can be updated.

If Alice attempts to double spend over the amount of her account balance, by initiating two transactions at the same time, some proportion of the client nodes will report back that the transaction is no good, and Bob can respond accordingly, by rejecting the transaction. If Alice tried to double spend by sending two simultaneous cryptocurrency payment messages to different primary clients at the same time, at least some of the clients in the nested propagation network would invalidate it if her account balance was insufficient to cover both. In another preferred embodiment Bob can send an additional message back to the local blockchain canceling his claim on the transaction, again illustrated by FIG. 3, 307.

In the same manner any other transaction can be memorialized by the local blockchain. In the case of a smart contract, and if Alice and Bob are on different local blockchains the contract can be recorded in both.

Provisions for Client Software Updates

Past experience in cryptocurrency has demonstrated that from time to time it may be desirable to incorporate new features, alter parameters or implement bug fixes. For this purpose at least, some central coordinating developer entity is desirable, to make the programming decisions and distribute an updated client software package when necessary, otherwise sectarian chaos can ensue, as is already being seen in the existing cryptocurrency development space.

In one embodiment, the client software is signed with the private key of a developer entity. When an update is desired the developer entity can distribute the updated client through the network with an "activate on" time parameter associated with it. This can be validated by clients on the network from the signature as any other hash message, and installed and implemented at the appointed time. A modest hiatus in network activity at a relatively low usage time might be provided for to ease the transition.

In one embodiment each message in the system can additionally carry the operating software version number being used. After the passage of the implementation time of the updated software, if a client running an older version tries to send a message to a client running the latest update, if the update is critical the message will not be acted on, but in any case a message is returned to that the first client that they must update.

CONCLUSION

We have taught herein a suite of coordinated methods and algorithms to solve all the manifest, and heretofore intractable, problems with existing cryptocurrency systems. Any useful features, which may already be known in such systems, including smart contracts, multiparty transactions, lock dates for transactions, etc., can easily be incorporated using the structural framework so taught, and are expressly anticipated according to the needs of a particular system. And we further note that even if the first limiting parameter and the second limiting parameter we set to numbers so high that they would never be reached, such that the system remained a single blockchain, either of the two innovations of 1) having the validator of each new block sign that block with their private key, or 2) having each transaction include in a hash of that transaction a number from a previous block, would alone produce a vast improvement in the immutability of that single blockchain.

All the features disclosed in this specification (including any accompanying claims, abstract and drawings) may be replaced by alternative features serving the same, equivalent or similar purpose, unless expressly stated otherwise. It is expressly understood that each feature disclosed is one example only of a generic series of equivalent or similar features. Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims is not intended to invoke the provisions of 35 U.S.C. § 112.

I respectfully claim:

1. A system comprising:
a first blockchain, comprised of blocks added sequentially to said first blockchain, each block comprised of data and a cryptographic hash of said data;
a first limiting parameter of a number of client accounts to associate with any blockchain;
a second limiting parameter of a size number of a set of sub-blockchains of any blockchain;
a system server comprising:
  a first computing processor device; and
  a first memory;
  the first memory storing a first set of computer readable instructions that when executed by the first computing processor device cause the first computing processor device to perform the steps of:
  a) associating, up to the first limiting parameter, client accounts with the first blockchain;
  b) after the first limiting parameter is exceeded, creating, up to the second limiting parameter, a set of first sub-blockchains of the first blockchain, each first sub-blockchain comprised of blocks added sequentially to the first sub-blockchain, each block comprised of first sub-blockchain data and a cryptographic hash of said first sub-blockchain data;
  c) associating, up to the first limiting parameter, additional client accounts with each first sub-blockchain;
  d) after the first limiting parameter of a number of client accounts associated with each first sub-blockchain is exceeded creating, up to the second limiting parameter, a set of second sub-blockchains of the first sub-blockchain, each second sub-blockchain comprised of blocks added sequentially to the second sub-blockchain, each block comprised of second sub-blockchain data and a cryptographic hash of said second sub-blockchain data;
  e) associating, up to the first limiting parameter, further additional client accounts with each second sub-blockchain;
  f) after the first limiting parameter of a number of client accounts associated with each second sub-blockchain is exceeded creating, up to the second limiting parameter, a new set of sub-blockchains of further sub-blockchains of the second sub-blockchains, each further sub-blockchain comprised of blocks added sequentially to the said further sub-blockchain, each block comprised of the further sub-blockchain data and a cryptographic hash of said further sub-blockchain data;
  g) associating, up to the first limiting parameter for each further sub-blockchain said further additional client accounts with each said further sub-blockchain;
  h) repeating step g) until the first limiting parameter is not exceeded; if exceeded, creating, for that further sub-blockchain, a new set of further sub-blockchains up to the second limiting parameter, each said further sub-blockchain comprised of blocks added sequentially to the said further sub-blockchain, each block comprised of said further sub-blockchain data and a cryptographic hash of said further sub-blockchain data, and repeating step g);
a plurality of blockchain nodes, each blockchain node comprising:
  a second computing processor device; and
  a second memory;
  the second memory storing a second set of computer readable instructions that when executed by the second computing processor device cause the blockchain node to perform the steps of:
  i) for the blockchain nodes of the client accounts associated with the first blockchain, recurrently selecting a validating node for each block of said first blockchain,
  j) the selected validating node configured to perform the steps of:
    cryptographically creating a first digital hash of data in each block to be added to the first blockchain,
    adding the first digital hash to each block,
    adding each block to the first blockchain, and
    passing the first digital hash to the data of the next block to be added to the first blockchain;
  k) passing the first digital hash to the data of the next block to be added to each sub-blockchain which does not have its own set of sub-blockchains;
  l) for the blockchain nodes of the client accounts associated with each sub-blockchain, recurrently selecting another validating node for each block of each sub-blockchain, the selected another validating node configured to perform the steps of:
    cryptographically creating a second digital hash of the data of the new block to be added to the sub-blockchain,
    adding second digital hash to the new block,
    adding the new block to the sub-blockchain, and,
    passing the said second digital hash to the data of the next block to be added to the sub-blockchain, and
  m) also passing the second digital hash to the data of the next block to be added to the blockchain of which the sub-blockchain is a sub-blockchain.

2. The system of claim 1, further comprising the validating node in any of steps 21(j), 21(k), 21(l) or 21(m), passing the first or second digital hash to the data of the next block to be added to the blockchain or sub-blockchain, by sending a digital message to one or more of the blockchain nodes for the client accounts associated with the one or more blockchains,
  n) upon receiving the digital message, the one or more blockchain nodes further sending the digital message to one or more of the remaining additional blockchain nodes for the client accounts associated with the said first blockchain or first sub-blockchain, and
  o) repeating step 22(n) until all the additional node computing devices for the client accounts associated with the blockchain or sub-blockchain have received the digital message.

3. The system of claim 1 further comprising timing the passing, in step 21(*k*), of each digital hash such that it is passed before the next block is added to any of the sub-blockchains which does not have its own set of sub-blockchains, and p) timing the passing, in step 21(*m*), of each digital hash such that it is passed before the next block is added to the blockchain of which the sub-blockchain is a sub-blockchain.

\* \* \* \* \*